March 30, 1926.                                                                 1,578,355
B. C. OLNEY
APPARATUS FOR REMOVING THE STEM OR BLOW ENDS
FROM FRUIT, VEGETABLES, OR THE LIKE
Filed April 28, 1924                2 Sheets-Sheet 1

INVENTOR.
Burt C. Olney
BY
his ATTORNEYS.

March 30, 1926.
B. C. OLNEY
1,578,355
APPARATUS FOR REMOVING THE STEM OR BLOW ENDS
FROM FRUIT, VEGETABLES, OR THE LIKE
Filed April 28, 1924    2 Sheets-Sheet 2
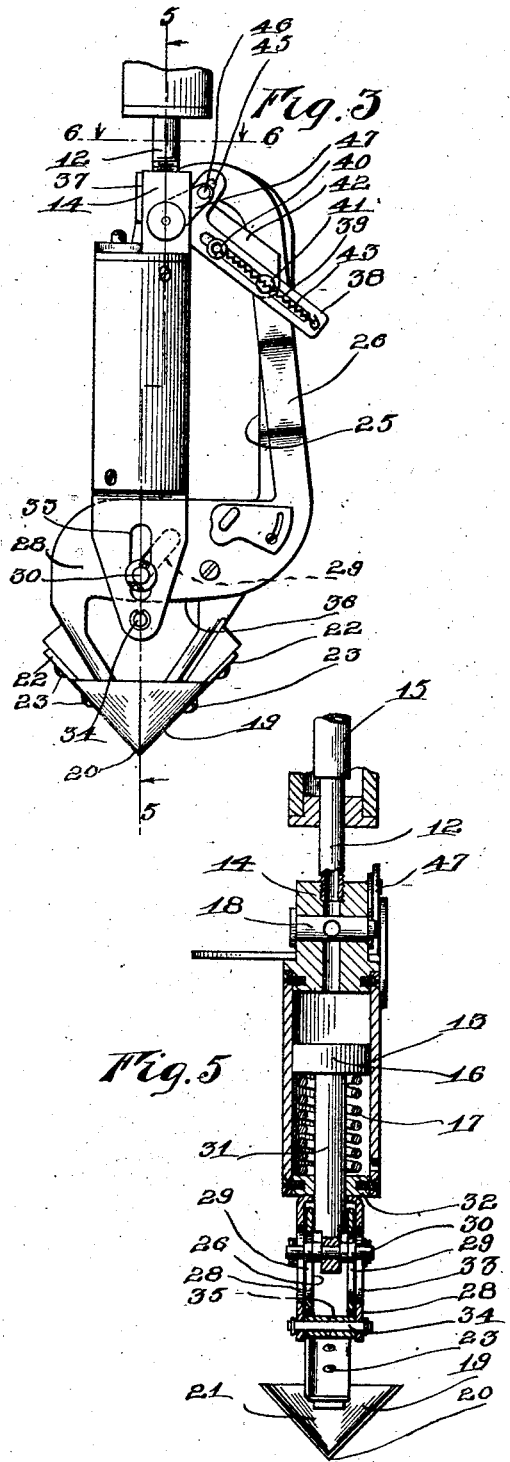
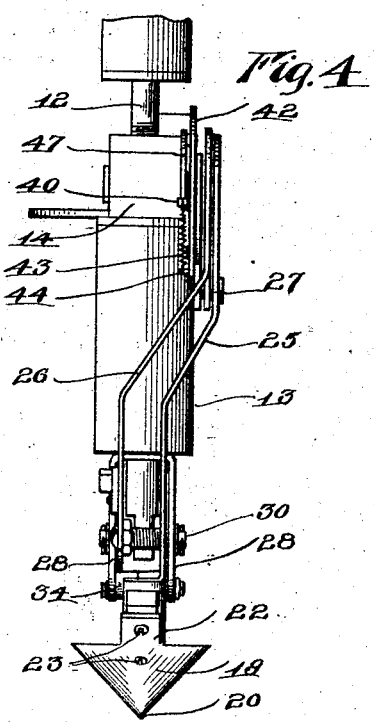
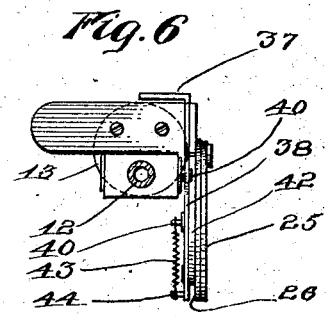
INVENTOR.
Burt C. Olney
BY Davis Timms
his ATTORNEYS.

Patented Mar. 30, 1926.

1,578,355

UNITED STATES PATENT OFFICE.

BURT C. OLNEY, OF ROCHESTER, NEW YORK, ASSIGNOR TO NEW YORK CANNERS, INC., OF ROCHESTER, NEW YORK.

APPARATUS FOR REMOVING THE STEM OR BLOW ENDS FROM FRUIT, VEGETABLES, OR THE LIKE.

Application filed April 28, 1924. Serial No. 709,336.

*To all whom it may concern:*

Be it known that I, BURT C. OLNEY, a citizen of the United States, and resident of Rochester, in the county of Monroe and State of New York, have invented certain new and useful Improvements in an Apparatus for Removing the Stem or Blow Ends from Fruit, Vegetables, or the like, of which the following is a specification.

The present invention relates to an apparatus for removing the stem or the blow ends from fruit, vegetables or the like, and an object of this invention is to make it possible to remove the stem or the blow ends of fruits or the like without any handling of such articles. A further object of the invention is to provide an apparatus in which the stem or the blow ends of fruits, vegetables or the like may be removed with a minimum amount of work on the part of the operatives.

To these and other ends, the invention consists of certain parts and combinations of parts, all of which will be hereinafter described: the novel features being pointed out in the appended claims.

In the drawings:

Fig. 3 is an enlarged view similar to Fig. 2 from the opposite sides of the invention;

Fig. 4 is a detail view showing another side view of the invention;

Fig. 5 is a section on the line 5—5, Fig. 3;

Fig. 6 is a section on the line 6—6, Fig. 3; and

Figure 1:
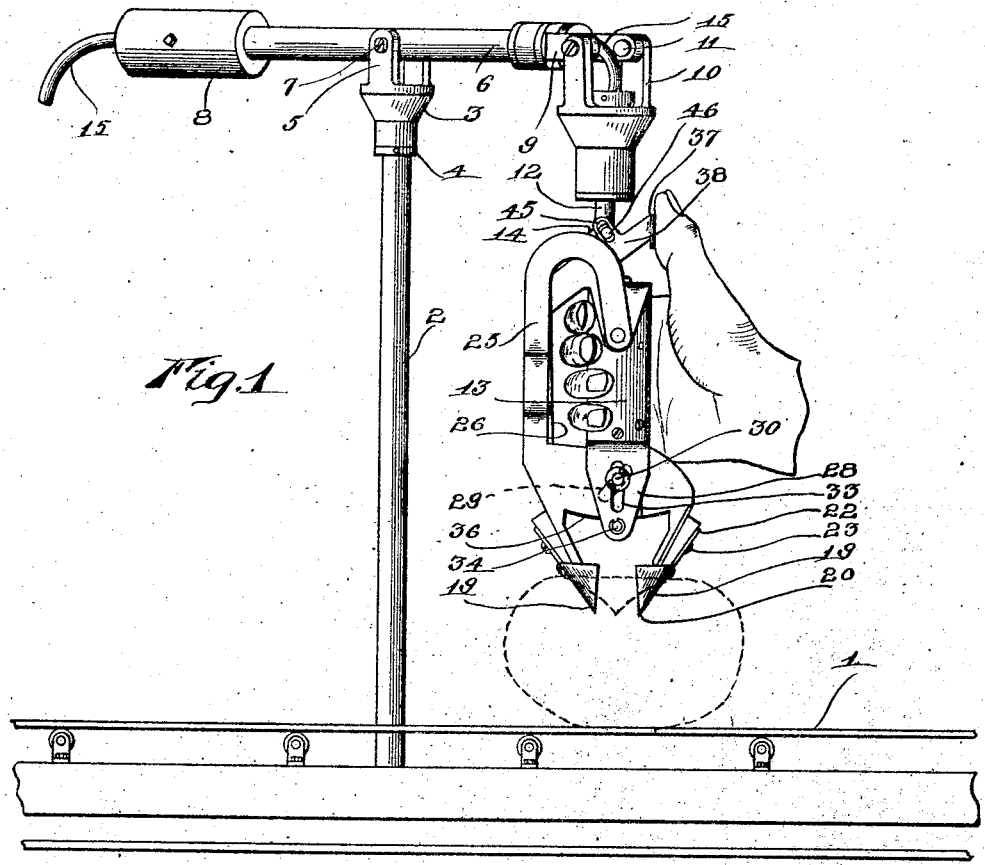
Fig. 1 is a side view of an apparatus constructed in accordance with this invention.
Figure 2:
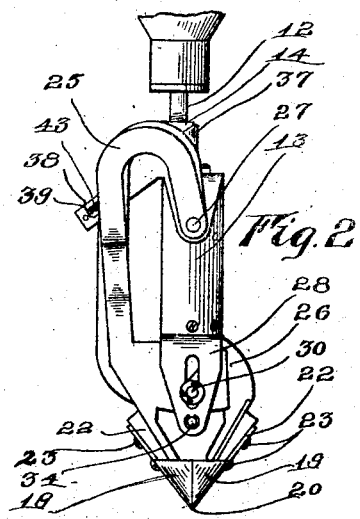
Fig. 2 is a detail view of the apparatus shown in Fig. 1, showing the invention in closed position.
Figure 7:
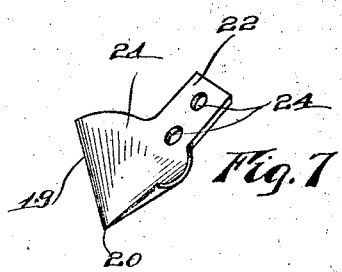
Fig. 7 is a detail view of one of the cutters.

Referring more particularly to the drawings, 1 indicates a carrier, in this instance, in the form of an endless belt on which the fruit such as tomatoes or apples are placed with the end thereof to be removed faced upwardly, so as to be carried to the removing means. Preferably the removing means is supported by a standard or upright 2 which has a head 3 rotatable about an upright axis on the standard 1 above a collar 4. This head has two bearing arms 5 between which a supporting arm 6 is pivotally mounted at 7. This supporting arm is in the form of a tube which has a weight 8 in the form of a sleeve adjustable on the arm on one side of the pivot, while at the opposite end a yoke 9 is mounted to turn on the arm 6 about an axis coincident with the longitudinal axis of the arm. This yoke 9 in turn has a yoke 10 pivotally connected thereto by a pivot 11 to swing about a horizontal axis, and the yoke 10 is in turn journalled to the end of a tube 12 which is rigidly connected to a motor for operating the removing means.

The motor, in this instance, embodies a cylinder 13 having a head 14 at its top with which the tube 12 connects, so as to lead air or other fluid to the cylinder. The tube 12 connects by a flexible tube 15 with the fluid or air supply, the tube 15 extending through the supporting arm 6 from the rear end of the latter to connect with any suitable fluid supply. Within this cylinder 13 a piston 16 operates, this piston being held toward the upper end of the cylinder by a helical spring 17 opposing the downward movement of the piston. In the head 14 a rotary valve 18 is arranged which controls the supply of fluid to the cylinder.

The removing means, in this instance, embodies two cutters or knives each having, in this instance, two cutting edges 19 converging downwardly toward each other so that they intersect at a point 20. The knives extend from a curved body portion 21 from the upper end of which proceeds a lip 22, through which screws 23 pass through screw openings 24 in the lip and are secured to the knife supports.

The knife supports, in this instance, embody two arms 25 and 26 both pivoted at 27 to one side of the cylinder casing 13 and extending upwardly from their pivots, then outwardly and downwardly to lie between two arms 28 projected downwardly from the under side of the cylinder 13. The arms are provided with oppositely extending slots 29 and in these slots a cross pin 30 operates, this cross pin being secured to a plunger 31 which is rigidly connected to the piston 16 and is guided in the lower head 32 of the cylinder. The cross pin also is guided in its ends in slots 33 formed in the arms 28. Below the pivoted supporting arms 25 and 26, the arms 28 are connected by a tie pin 34 on which rollers 35 are journalled, these rollers co-operating with the curved edges 36 on the arms to guide the latter in their movements. The cross pin 30, being moved up and down by the piston 16 in the oppositely extending slots 29, imparts to the two arms 25 and 26 opposite movement on their common pivot 27. The pin 30 by being guided in the slots 33 is prevented from being moved laterally during the movement of the levers.

For controlling the valve of the motor a thumb piece 37 is provided on the end of a slide 38, the latter being slotted in the direction of its length at 39 and operating on two guide pins 40 and 41 projecting laterally from a plate or bracket 42 secured to the cylinder 13. A spring 43 secured at one end to the guide pin 40 and at the other end to a pin 44 on the slide tends normally to move the slide in a direction to close the valve 18 while pressure on the thumb piece 37 moves the slide 39 in the direction to open the valve. Connection between the slide and the valve is provided, in this instance, by a slot 45 in the slide and a pin 46 extending into the slot from an arm 47 which is extended laterally from the shaft of a valve 18. It will be noted that the thumb piece 37 is arranged above the cylinder 13 and that the cylinder serves as a grip for the hand of the user, the thumb piece being so positioned that while presenting the removing devices to the fruit, vegetables or the like the thumb piece may be operated to effect the operation of the removing devices by a hand gripping the cylinder.

Owing to the manner in which the removing devices may move toward and from the carrier and also in the direction of the length and transversely of the carrier, it is possible to cause them to be presented directly over the fruit on the carrier, notwithstanding the fact that the fruit is being moved by the carrier. After the fruit is engaged, the knives are forced into the same on opposite sides of the portion to be removed and are then operated toward each other to cause them to cut out and remove the undesirable portion. Of course, with the release of the thumb piece, the removed portion will drop from the cutters and an apparatus will then be in position to operate upon another fruit. The form of the cutters is believed to be novel and it is also believed to be novel to so support removing means for the stem or blow ends of fruit, vegetables or the like, so that it may be readily moved into engagement with a fruit on a movable carrier for the purpose of removing the stems or the blow ends of the fruit, vegetables or the like without any handling of the material or the articles by the operative.

In the use of the invention, tomatoes or other fruit, vegetables or the like are placed upon the belt 1 and the removing means is moved toward the fruit on the belt by means of the grip 13. After the removing means has been caused to penetrate the fruit, the hand on the grip piece 13 presses upon the finger piece 37 and supplies fluid to the cylinder and this fluid acting on the piston 16 causes the knives 21 to move toward each other and cut out from the fruit, the undersirable portion. The hand grip is then moved upwardly carrying with it the matter cut from the fruit and thereafter the hand of the user releases the finger piece to permit the separation of the knives.

What I claim as my invention and desire to secure by Letters Patent is:—

1. An apparatus for removing the stem or the blow ends of fruit, vegetables or the like comprising removing means for the stem or the blow ends, and means for movably supporting said removing means, a hand grip connected with said removing means for bringing the removing means into and out of cooperation with the articles, and means positioned adjacent the hand grip and controllable by a hand while on said grip for effecting the operation of the removing means.

2. An apparatus for removing the stem or the blow ends of fruit, vegetables or the like comprising a movably mounted removing means for the stem or the blow ends of the articles, a motor for operating said removing means, a hand grip associated with said removing means for effecting its movement toward and from the articles, and a controlling device for the motor arranged adjacent to the hand grip so that a hand on the grip may control the motor.

3. An apparatus for removing the stem or the blow ends of fruit, vegetables or the like comprising removing means for the stem or the blow ends, a hand grip associated with said means, and a counter balanced arm on which said removing means and grip are supported.

4. An apparatus for removing the stem or the blow ends of fruit, vegetables or the like comprising a removing means for the stem or the blow ends, a hand grip associated with said removing means, and a counter balanced arm on which said hand grip and removing means are pivotally suspended.

5. An apparatus for removing the stem or the blow ends of fruit, vegetables or the like comprising a standard, a supporting arm pivotally mounted between its ends of the standard, a counter balancing device on one side of said pivot, a removing means for the stem or the blow ends pivotally suspended from the arm on the opposite side of its pivot, and a hand grip associated with said removing means.

6. An apparatus for removing the stem or the blow ends of fruit, vegetables or the like comprising two opposed cutters, two pivotally mounted levers by which the cutters are supported, a plunger connected to said levers for operating them, a motor for operating the plunger and movable supporting means for supporting said motor, the plungers and the levers.

7. An apparatus for removing the stem or the blow ends of fruit, vegetables or the like comprising two opposed cutters, two pivotally mounted levers by which the cutters are supported, a plunger connected to said levers for operating them, and a motor for operating the plunger, said motor embodying a cylinder forming a hand grip, a piston operating in the cylinder and connected to the plunger, a valve controlling the movement of the piston, and controlling means for said valve embodying a thumb piece arranged adjacent to the cylinder so that a hand gripping the cylinder may control said thumb piece.

8. In an apparatus for removing the stem or blow ends of fruit, vegetables or the like, comprising a tubular pivoted supporting arm, a counter balance on the arm on one side of the pivot, a removing means for the stem or blow ends suspended from the arm on the opposite sides of the pivot, a motor for controlling the removing means suspended with said removing means from the arm, and means for supplying energy to the motor extending through said supporting arm.

9. In an apparatus for removing the stem or the blow ends of fruit, vegetables or the like comprising a tubular pivoted supporting arm, a counter balance on the arm on one side of the pivot, a removing means for the stem or blow ends suspended from the arm on the opposite side of the pivot, a fluid motor for controlling said removing means, and a conductor pipe leading fluid to the motor and extending through the supporting arm.

BURT C. OLNEY.